US012753013B2

(12) United States Patent
Rauwerdink et al.

(10) Patent No.: US 12,753,013 B2
(45) Date of Patent: Oct. 6, 2026

(54) HORIZONTAL CONVEYOR, PREFERABLY FOR TRANSPORTING PALLETS LOADED WITH GOODS

(71) Applicant: NEDCON B.V., Doetinchem (NL)

(72) Inventors: Edwin Rauwerdink, Winterswijk (NL); Jeronimus Geradus Maria Besselink, Zutphen (NL)

(73) Assignee: NEDCON B.V., Doetinchem (NL)

( * ) Notice: Subject to any disclaimer, the term of this patent is extended or adjusted under 35 U.S.C. 154(b) by 57 days.

(21) Appl. No.: 18/848,947

(22) PCT Filed: Mar. 17, 2023

(86) PCT No.: PCT/EP2023/056883
§ 371 (c)(1),
(2) Date: Sep. 20, 2024

(87) PCT Pub. No.: WO2023/186572
PCT Pub. Date: Oct. 5, 2023

(65) Prior Publication Data

US 2025/0197122 A1 Jun. 19, 2025

(30) Foreign Application Priority Data

Apr. 1, 2022 (DE) ..................... 10 2022 107 853.1

(51) Int. Cl.
*B65G 21/20* (2006.01)

(52) U.S. Cl.
CPC ................................ *B65G 21/2063* (2013.01)

(58) Field of Classification Search
CPC .... B65G 21/2072; B65G 21/08; B65G 13/11; B65G 15/08; B65G 15/60; B65G 15/64; B65G 21/02; B65G 21/2063; B65G 21/2081; B65G 2203/044; B65G 23/12; B65G 39/12; B65G 39/20
See application file for complete search history.

(56) References Cited

U.S. PATENT DOCUMENTS 3,491,873 A * 1/1970 Fauth ................ B65G 21/2072
198/841
3,844,405 A 10/1974 Shuford
2018/0346253 A1 12/2018 Kahrger et al.

FOREIGN PATENT DOCUMENTS

AU 2246767 A 12/1969
CN 111003518 A * 4/2020 ............ B65G 61/00
(Continued)

*Primary Examiner* — Gene O Crawford
*Assistant Examiner* — Amari J Meddling
(74) *Attorney, Agent, or Firm* — Smartpat PLC

(57) ABSTRACT

A horizontal conveyor is proposed, including a main framework with a framework base which can be fixedly anchored on a surrounding floor and a frame supported on the framework base. Rollers or rolls, with or without a conveyor belt guided over the rollers or rolls, are rotatably mounted in the frame, such that a conveying path for a goods stack is formed. In order to protect persons and objects in the surroundings in the event of unstable goods stacks, a protection device is proposed, including a protection wall disposed along the conveying path on at least one of the two sides of the conveying path. The protection wall extends at least at a height above the conveying path which is greater than or equal to the width of the conveying path. The protection wall is fastened to the main framework.

16 Claims, 3 Drawing Sheets

(56) References Cited

FOREIGN PATENT DOCUMENTS

| | | | | |
|---|---|---|---|---|
| DE | 2343520 | A1 | 3/1974 | |
| DE | 7343539 | U | 3/1974 | |
| DE | 69405308 | T2 | 4/1998 | |
| DE | 212006000085 | U1 * | 9/2008 | ......... B65G 21/2072 |
| DE | 102017209310 | A1 * | 12/2018 | ............. B65G 13/11 |
| KR | 101107773 | B1 | 1/2012 | |

* cited by examiner

HORIZONTAL CONVEYOR, PREFERABLY FOR TRANSPORTING PALLETS LOADED WITH GOODS

CROSS-REFERENCE TO RELATED APPLICATION

This application is a national stage application, filed under 35 U.S.C. § 371, of International Patent Application PCT/EP2023/056883, filed on Mar. 17, 2023, which claims the benefit of German Patent Application DE 10 2022 107 853.1, filed on Apr. 1, 2022.

BACKGROUND

The application relates to a horizontal conveyor, preferably for transporting pallets loaded with goods. Such horizontal conveyors are known, for example as roller conveyors consisting of individual rollers or rolls which are rotatably disposed behind one another, or as belt conveyors, or as a combination of roller conveyors and belt conveyors. They are used in the technical field of logistics to transport stacks of goods, for example in the form of goods stacked on pallets or in pallet cages, from one place to another. These stacks of goods often reach considerable heights, owing to the fact that goods are stacked up to a height which may be two or three times the width of the stack of goods, for example.

Known from DE 73 43 539 U is a horizontal conveyor for transporting containers. During transport, the containers lie on a conveyor belt, whereby there are simultaneously guided in a channel formed by profiled walls. The static basic construction of the horizontal conveyor is formed by elevated supports which are disposed at regular longitudinal spacings and consist in each case of two vertical supports and a yoke that connects the supports. A crossbeam, which forms the fixed base for the conveyor belt sliding on the yoke, is supported thereon. Because the conveyor belt is endless and revolves, it consists—apart from the active belt portion, thus the transporting belt portion—also of a returning belt portion. It is to be assumed that the latter is returned in a lower stand of the horizontal conveyor, which is disposed below the elevated supports.

There have been very few isolated cases in which pallets loaded to a great height have tilted over due to uncontrolled movements while being transported on the horizontal conveyor. This may not be critical as long as the direction of falling coincides with the transporting direction of the horizontal conveyor. However, situations in which a stack of goods tilts over sideways, in the worst case personnel being present next to the conveying section, are critical. However, goods or other objects arranged in that area can also be affected in such critical situations.

SUMMARY

The disclosure is based on the object of making provision on a horizontal conveyor by way of technical measures for the event of accident-prone situations which may arise in exceptional circumstances due to uncontrolled movements of a stack of goods during transport.

A horizontal conveyor which is provided with a protective device as disclosed and claimed achieves this object.

The horizontal conveyor comprises a main stand which is constructed from at least two parts and which consists of a stand foot, which is able to be fixedly anchored on a surrounding floor, and of a frame which is supported on the stand foot and has rollers or rolls that are rotatably mounted therein while forming a conveying section for the stack of goods, with or without a conveyor belt guided over the rollers or rolls.

The protective device is characterized by a protective wall which is disposed along the conveying section on at least one of the two sides of the conveying section, wherein the protective wall extends above the conveying section at least at a height which is equal to or greater than the width of the conveying section, and wherein the protective wall is fastened to the main stand.

If protection is necessary or expedient not only on one side but on both sides of the conveying section, a preferred design embodiment of the horizontal conveyor is characterized by a protective wall on each of the two sides of the conveying section, wherein the respective protective wall extends above the conveying section at least at a height which is equal to or greater than the width of the conveying section, and wherein the respective protective wall is fastened to the main stand.

The technical solution described herein is based, inter alia, on the concept that pallets with stacks of goods disposed thereon of only a minor height are at less risk of tilting over when transported on the horizontal conveyor. Measures intended to prevent this are thus not really necessary.

It is different in the case of pallets with a stack of goods of considerable height. Should uncontrolled movements arise in specific situations in this instance, there is the risk of the pallet together with the stack of goods, or of only the stack of goods, tilting over. In order to preclude any risk for personnel in the vicinity even in such situations, the protective device proposed here comprises a protective wall which extends above the conveying section at least at a height which is equal to or greater than the width of the conveying section, wherein the width of the conveying section is the effective length of the rollers or rolls for transporting, or the width of a conveyor belt forming the transport means.

For example, if the width of the conveying section is 90 cm, the protective wall should be located at least at a height of 90 cm above the conveying section; at least part of the protective wall should be present at this height. Preferably however, a protective wall should be present at double this height, thus at a height of, for example, 180 cm or even more.

The protective wall, or a protective wall, preferably extends above the conveying section at least at a height which is 1.5 to 2.5 times the width of the conveying section.

It is particularly advantageous when any tilting of the stack of goods toward lateral tilting over is prevented already at the outset, or in any case already at a minor tilting angle. For this purpose, it is important to dispose the respective protective wall at the smallest possible distance from the lateral walls of the stack of goods, whereby an excessive proximity has to be avoided, however, in order to avoid the stack of goods scraping on the protective wall, which may lead to damage to the goods.

In any case however, the protective wall can be positioned relatively close to the lateral faces of the stack of goods if the required stationary fastening of the protective wall permits this. Therefore, the protective wall is not fastened to the surrounding floor but fastened by being connected directly to the main stand of the horizontal conveyor, for example by way of corresponding threaded connections.

According to a preferred design embodiment of the protective device, the protective wall is fastened to the stand foot of the main stand, preferably exclusively to the stand foot. This leads to a fastening in a region which is indeed proximal to the floor, but not on the floor per se, which can be advantageous, for example, in view of the frequently required cleaning of the floor surface. The fastening exclusively to the stand foot of the main stand is also advantageous because the stand foot is specifically designed to be particularly stable and as a result can absorb additional loads, not least because its strength is further increased as a result of its anchoring in the floor.

With a view to a particularly good static design, it is also advantageous when the stand foot of the horizontal conveyor is in two parts and is assembled from first and second profiles which are disposed in the longitudinal direction of the conveying section, are mutually parallel, and are preferably identically designed profiles.

A design embodiment of the stand foot in which the first and second profiles each have profiled regions which extend parallel to the floor and through which screws that are able to be anchored in the floor are guided for fixedly anchoring the stand foot on the floor is preferred.

In terms of a design embodiment of the frame of the main stand it is proposed that the frame consists of side frames on which the rollers or rolls are mounted, and of a base, which is disposed between the side frames, and that the base is supported on the stand foot and fixedly connected thereto.

For example, the protective wall can be fixed to upright supports which are disposed in succession along the conveying section, and of which the lower ends are fastened to the main stand. The protective wall here is preferably fixed to that side of the respective support that faces the conveying section. The lower ends of the supports can be connected to the stand foot of the main stand by way of one or a plurality of threaded connections. Alternatively, the lower ends of the supports can be welded to the stand foot.

The supports, including their lower ends, should be disposed at a vertical spacing from the floor so that the supports do not impede the required regular cleaning of the floor. This has the further advantage that the floor surface remains free from assembly elements.

There are various possibilities in terms of the design of the protective wall. The protective wall can thus be designed as at least one horizontally extending plank, similar to a guardrail. Two or three planks which are disposed on top of one another can also conjointly form the protective wall.

It can be advantageous when no further protective wall regions are located below the plank or the planks, but above the conveying plane. For example, neither the plank nor parts thereof should be located at a height which is smaller than the width of the conveying section. As a result, the accessibility to the horizontal conveyor from the side is not impeded, for example in the context of maintenance work.

The design embodiment of the protective wall as a safety net which is suspended from fastening points on the supports can also be advantageous. Such a safety net is also suitable for preventing falling or tilting objects becoming a risk to the surroundings.

In another design embodiment, the protective device has the form of a tunnel. The protective walls which are disposed on both sides of the conveying section are lateral wall regions of a tunnel which arches over the conveying section in the shape of an inverted U. Profiled plates which can be bent to the desired arcuate shape are suitable as a material of the tunnel. Such a design of the protective device overall offers the greatest protective effect but requires a relatively high input in terms of material.

However, in addition to the above, there are also many other possibilities in terms of the design of the protective device according to the invention.

BRIEF DESCRIPTION OF THE DRAWINGS

Exemplary embodiments of the protective device on a horizontal conveyor are described hereunder by means of the drawings, in which.

DETAILED DESCRIPTION

Provided by the horizontal conveyor 1 reproduced in the figures is a conveying section 2 for transporting pallets P which are provided with stacks of goods W lying on the pallets P. The stacks of goods W can have a considerable height. The transporting mechanism of the conveying section 2 can be formed by, for example, driven rollers or rolls, or by a conveyor belt which is guided over rollers or rolls, or by a belt conveyor.

The goods to be transported do not necessarily have to be located on a pallet. For example, they can also be transported in pallet cages on the conveying section 2, or their transport is performed entirely without any supporting loading aid.

Figure 2:
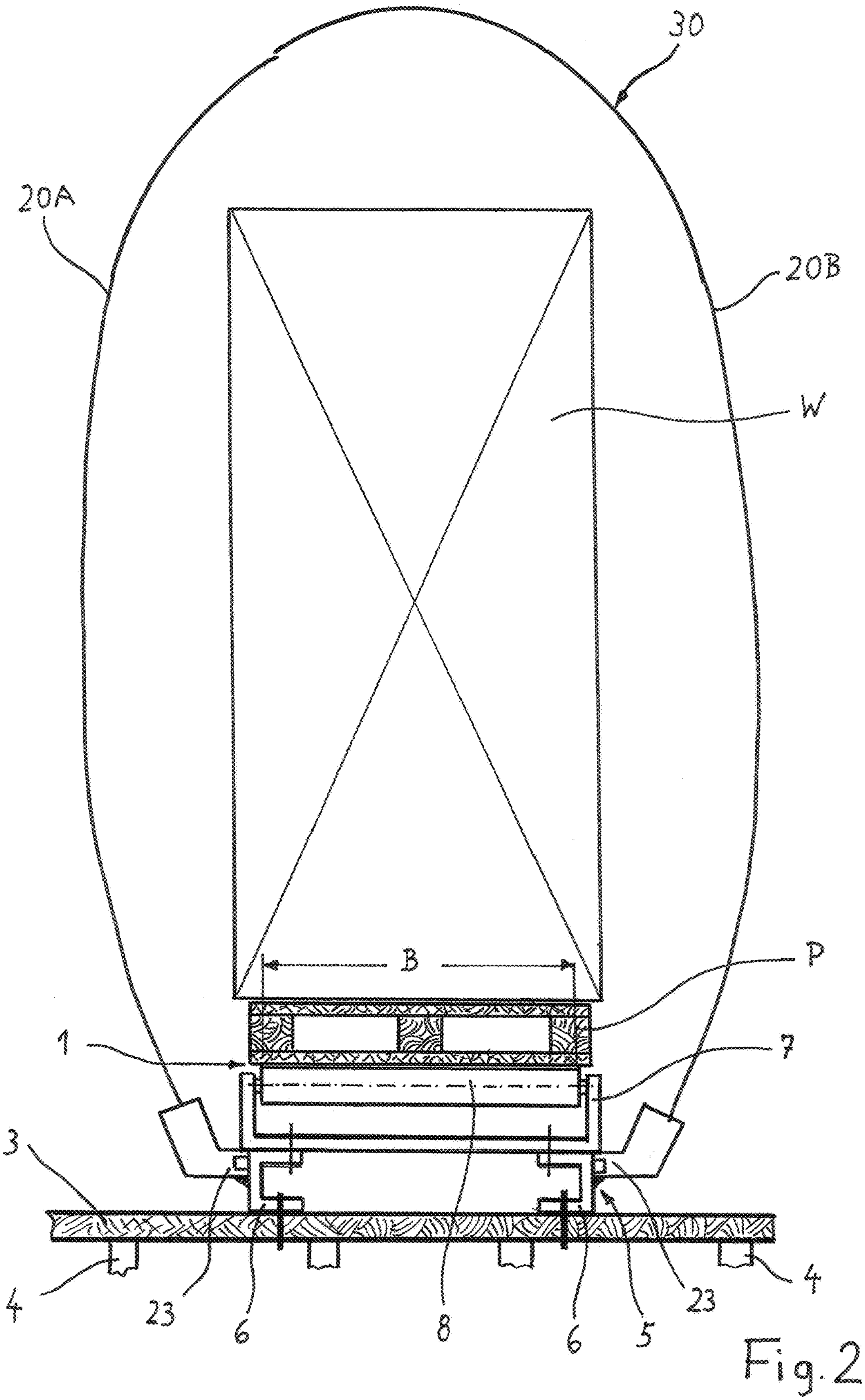
FIG. 2 shows another embodiment of a protective device on a horizontal conveyor in a view in the longitudinal direction, i.e. in the conveying or transporting direction, wherein the horizontal conveyor is illustrated with a pallet which is transported thereon and loaded with goods.

The horizontal conveyor does not have to be disposed on the factory floor but can be disposed, for example, on a platform which consists of a floor 3 made of floor plates and which is elevated in comparison to the actual factory floor, as is illustrated in FIG. 2. In this case, the platform with the floor plates is supported on the actual factory floor by way of vertical supports 4.

An aisle accessible to personnel is located on the factory floor, or the platform, so as to be parallel to the horizontal conveyor 1 and thus parallel to the conveying section 2.

Rollers or rolls 8 are rotatably mounted in a main stand of the horizontal conveyor. In the case of the design as a roller conveyor, the rollers or rolls 8, which are disposed with their rotation axis transverse to the conveying direction or transporting direction, form the conveying section 2 by way of their upper side on which the pallet P lies during transport. In the case of the design as a belt conveyor, an endless belt can additionally be guided around the rollers in such a way that the upper side of the belt on which the pallet P lies forms the conveying section 2.

In the first case, the width B of the conveying section 2, viewed transversely to the transporting direction, is the overall width of the rollers or rolls 8, and in the second case the width of the belt. The width B is adapted to the width of the pallets P or stacks of goods to be transported, when viewed in the transporting direction.

The main stand 5 is in at least two parts and is assembled from a stand foot 6 and a frame 7 which is supported thereon and fixedly connected to the stand foot 6. The mountings of the rollers or rolls 8 are located on or in the frame 7.

The frame 7 of the main stand 5 consists of side frames on which the rollers or rolls 8 are mounted, and a base which is disposed between the side frames. The base is supported on the stand foot 6 and fixedly connected thereto.

In the exemplary embodiments described here, the stand foot 6 of the main stand 5 is in two parts and is assembled from first and second profiles which are disposed in the longitudinal direction of the conveying section 2 and are mutually parallel. The two profiles can have a U-shaped profile cross section, or also have another profile cross section, for example by being formed as double T-profiles.

Figure 1:
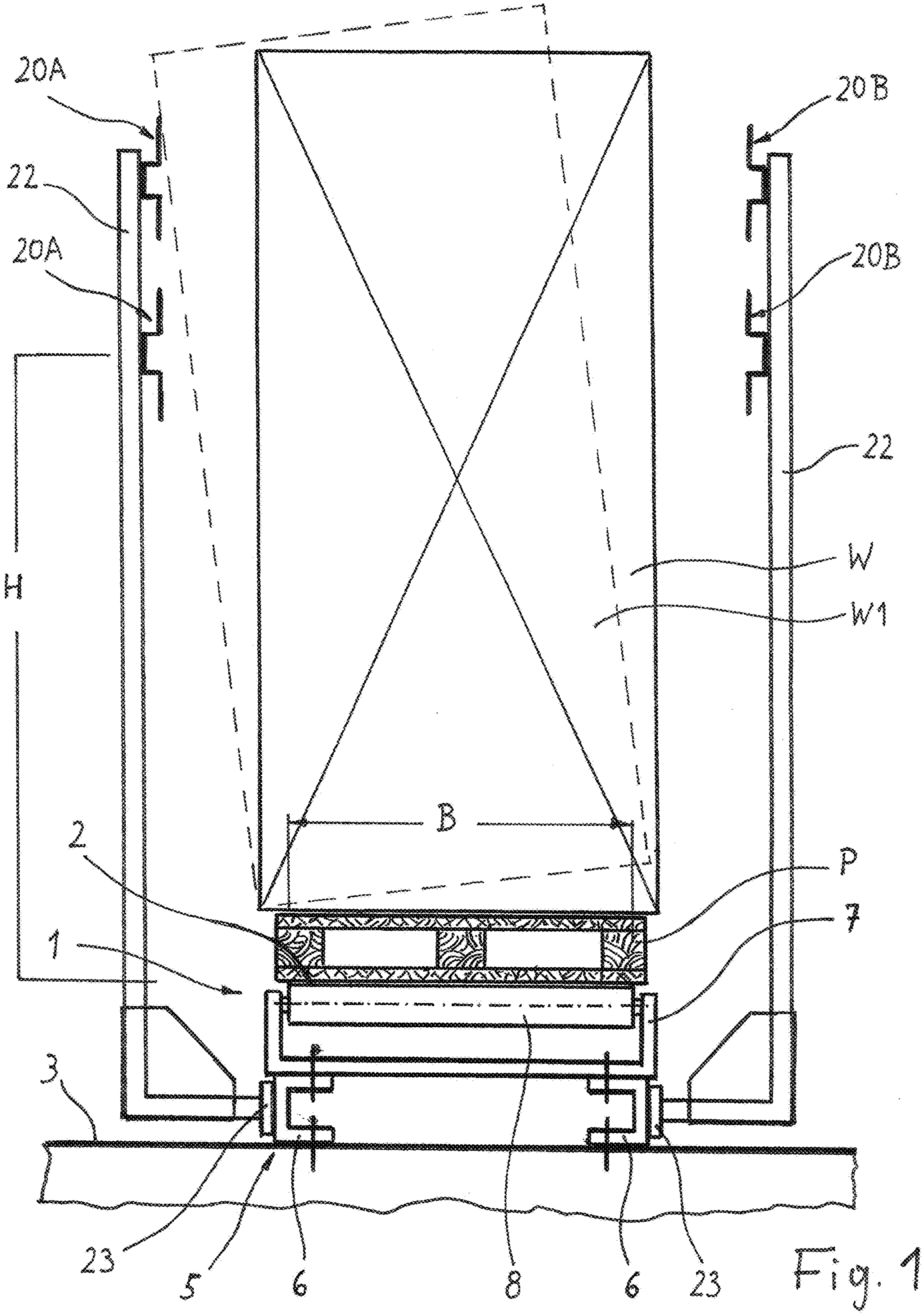
FIG. 1 shows a protective device on a horizontal conveyor in a view in the longitudinal direction, i.e. in the conveying or transporting direction, wherein the horizontal conveyor is illustrated with a pallet which is transported thereon and loaded with goods.

The two profiles that form the stand foot 6 preferably have identical profile cross sections, and in FIG. 1 and FIG. 2 are directly supported on the floor 3 by way of their lower side in each case. Moreover, they are fixedly anchored on the floor 3 in that profiled regions of the profiles which extend parallel to the floor 3 are vertically screwed to the floor. The stand foot 6, which is formed by the two profiles, preferably has an overall width which is smaller than the width of the frame 7 disposed thereabove.

An aisle in which personnel may also be present can extend next to and along the conveying section 2. Should a stack of goods W currently being transported tilt over in an indeed very rare situation which however cannot be entirely precluded, such personnel would be exposed to a very high risk by falling goods. Therefore, a protective device which has protective walls between the horizontal conveyor and the aisle, and which is described in yet more detail hereunder, is a constituent part of the arrangement.

Should a similarly dangerous situation exist on the other side of the horizontal conveyor, a corresponding protection is also located there, or a common protective device, i.e. one which offers equal protection on both sides, is used.

It is advantageous that parts of the protective device can also be retrofitted, thus also in the case of an already existing horizontal conveyor. The relatively minor additional space requirement of the protective device is advantageous even in the case of a retrofit. Additional fastening and assembling work on the floor 3 is not mandatory.

The protective device can be embodied in such a way, for example, that it does not form a wall which is completely closed toward the adjacent aisle, but that a connection between the conveying section 2 and the aisle continues to exist. This can be expedient, for example, so as to be able to carry out maintenance work on elements of the horizontal conveyor 1 from the aisle at any time, without first having to remove parts of the protective device for this purpose.

A constituent part of the protective device is an upright protective wall 20A on at least the respective side to be protected. Protective walls 20A, 20B are preferably located on both sides of the conveying section 2 along the conveying section 2.

In the embodiment of FIG. 1, the protective walls 20A, 20B are planks which extend horizontally along the horizontal conveyor at a specific minimum height. Two planks are disposed on top of one another on each of the two sides of the conveyor and conjointly form the left protective wall 20A and the right protective wall 20B, respectively.

The number of planks disposed on top of one another may vary. It is important that the support wall 20A, 20B designed in such a way is located at a specific minimum height and maximum height so as to be able to reliably catch a pallet of goods tilting over sideways. This is achieved in that the respective support wall 20A, 20B is located at a height H above the conveying section 2 which is equal to or larger than the width B of the conveying section. If the width B of the conveying section is, for example, 90 cm, the support wall should also be located at a height of 90 cm or higher. It preferably extends above the conveying section 2 at least at a height H which is 1.5 to 2.5 times the width B.

It can be advantageous when no parts of the protective wall 20A, 20B are located at a height which is smaller than the width B of the conveying section 2. This is because it is not necessary at such a minor height to support and thus catch pallets which are highly loaded and thus tend to tilt over. As a result of the absence of a protective or support wall at a minor height above the conveying section 2 it is, however, achieved that there continues to be a connection between the conveying section and the accessible aisle disposed beside the latter, so that maintenance work can be carried out on elements of the horizontal conveyor from the aisle, without first having to remove parts of the protective device.

In FIG. 1, the protective wall 20A, 20B is not fastened to the floor 3 but to the main stand 5. For this purpose, a plurality of upright supports 22 which are disposed in succession along the conveying section 2 are a constituent part of the protective wall 20A, 20B. The lower ends 23 of the supports 22 in FIG. 1 are fastened exclusively to the stand foot 6 of the main stand 5, for example by means of screws. The stand foot 6 in turn is fixedly anchored on the floor 3 by means of other screws.

The supports 22 are preferably disposed at regular spacings along the conveying section 2, for example at spacings of 2 m. In order to embody the protective wall 20A, 20B with smooth surfaces in the transporting direction, it is fixed on that side of the supports 22 that faces the conveying section 2. The fastening of the lower ends 23 of the supports 22 directly to lateral walls of the main stand 5 can be performed not just by a threaded connection but also by welding.

FIG. 1 shows, by way of a stack of goods W1 represented by dashed lines, the typical dangerous situation in which the stack of goods W has tilted toward one side, whereby it impacts, in its upper stack region, the protective wall 20A disposed there. This prevents further tilting over of the stack of goods W1. The illustration shows how decisive the minimum height is at which a protective wall 20A, 20B is disposed. This is because the upper stack region of the stack of goods is not laterally supported if the support wall is not sufficiently high. On the other hand, if the protective wall sits too high, specifically above the height of the stack of goods W1, it is not possible to catch the latter in the dangerous situation.

FIG. 2 shows another embodiment in which the protective walls 20A, 20B which are disposed on each of the two sides of the conveying section 2 are lateral wall regions of a more comprehensive tunnel 30 which arches over the conveying section 2 in the shape of an inverted U. The tilting protection here is thus not caused by a discrete supporting element such as, for example, a plank, but is achieved by a wall region of the more comprehensive tunnel 30 which is present at the correct height.

Profiled plates which can be bent to the U-shape without great complexity are suitable as a material for the tunnel 30. Instead of the vertical supports 22 which are present in FIG. 1, U-shaped frames which stabilize the shape of the tunnel in relation to relatively high forces can additionally be used in the embodiment according to FIG. 2.

These frames are preferably designed in such a way that they hold the outside of the plate material that forms the tunnel 30.

Also in FIG. 2, the anchoring of the protective walls 20A, 20B, or of the frames carrying and supporting the latter, is performed exclusively on the main stand 5, and preferably on the stand foot 6 of the latter which is fixed to the floor.

Figure 3:
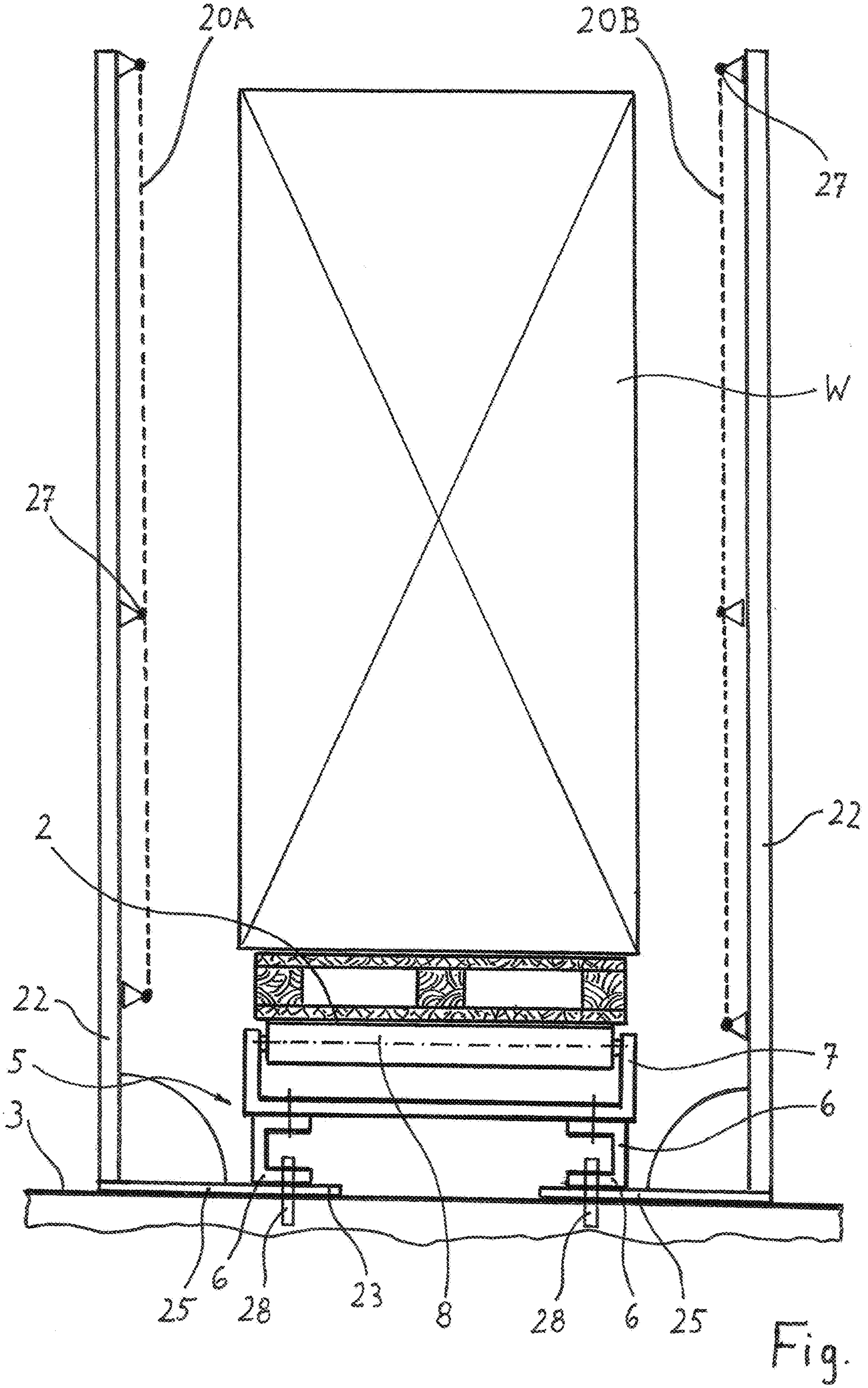
FIG. 3 shows yet another embodiment of a protective device on a horizontal conveyor in a view in the longitudinal direction, i.e. in the conveying or transporting direction, wherein the horizontal conveyor is illustrated with a pallet which is transported thereon and loaded with goods.

In the embodiment of FIG. 3, the protective walls 20A, 20B are designed as vertically disposed safety nets which extend along the conveying section 2. Safety nets here are disposed on both sides of the conveying section. The safety nets are fastened to horizontally tensioned ropes 27 which in turn are fastened to the upright supports 22.

In FIG. 3, the supports 22 are fastened to the stand foot 6 of the main stand 5, and at the same time to the floor 3. For this purpose, the lower end 23 of each support 22 has the shape of a horizontal plate 25 which is disposed between the stand foot 6 and the floor 3. Screws 28 which are anchored in the floor 3, run vertically through the stand foot 6 and at the same time through the horizontal plate 25 of the support 22.

It is generally advantageous to dispose the respective protective wall 20A, 20B at the smallest possible distance from the lateral walls of the stack of goods W. As a result, any tendency of the stack of goods W to tilt over to the side is already prevented at the outset, or in any case already at a small tiling angle. However, the support wall 20A, 20B must also not be too close to the stack of goods W, so that scraping of the stack of goods on the support wall cannot occur.

LIST OF REFERENCE SIGNS

1 Horizontal conveyor
2 Conveying section
3 Floor
4 Support
5 Main stand
6 Stand foot
7 Frame
8 Rollers, rolls
20A Protective wall
20B Protective wall
22 Support
23 End of the support
25 Plate
27 Rope
28 Screw
30 Tunnel
B Width
H Height
P Pallet
W Stack of goods
W1 Tilted-over stack of goods

The invention claimed is:

1. A horizontal conveyor for transporting pallets (P) loaded with goods, comprising:
- a main stand (5) comprising
  - a stand foot (6), the stand foot (6) being fixedly anchored on a floor (3), and
  - a frame (7), the frame (7) being supported on the stand foot (6) and having rollers or rolls (8) that are rotatably mounted in the frame (7), thereby forming a conveying section (2); and
- a protective device having a protective wall (20A, 20B) disposed along the conveying section (2) on at least one of two sides of the conveying section (2),
- wherein the protective wall (20A, 20B) extends above the conveying section (2) at a height (H) which is 1.5 to 2.5 times a width (B) of the conveying section (2), and
- wherein the protective wall (20A, 20B) is fastened to the main stand (5).

2. The horizontal conveyor as claimed in claim 1,
- wherein the conveying section (2) comprises a conveyor belt guided over the rollers or rolls.

3. The horizontal conveyor as claimed in claim 1,
- wherein the protective wall (20A, 20B) includes one protective wall (20A, 20B) on each of the two sides of the conveying section (2),
- wherein each protective wall (20A, 20B) extends above the conveying section (2) at least at the height (H) which is 1.5 to 2.5 times the width (B) of the conveying section (2), and
- wherein each protective wall (20A, 20B) is fastened to the main stand (5).

4. The horizontal conveyor as claimed in claim 1,
- wherein the protective wall (20A, 20B) is fastened to the stand foot (6) of the main stand (5).

5. A horizontal conveyor for transporting pallets (P) loaded with goods, comprising:
- a main stand (5) comprising
  - a stand foot (6), the stand foot (6) being fixedly anchored on a floor (3), and
  - a frame (7), the frame (7) being supported on the stand foot (6) and having rollers or rolls (8) that are rotatably mounted in the frame (7), thereby forming a conveying section (2); and
- a protective device having a protective wall (20A, 20B) disposed along the conveying section (2) on at least one of two sides of the conveying section (2),
- wherein the protective wall (20A, 20B) extends above the conveying section (2) at a height (H) which is equal to or greater than a width (B) of the conveying section (2),
- wherein the protective wall (20A, 20B) is fastened to the main stand (5), and
- wherein the stand foot (6) of the main stand (5) comprises two parts and is assembled from first and second profiles,
- wherein the first and second profiles are disposed in a longitudinal direction of the conveying section (2) and are mutually parallel.

6. The horizontal conveyor as claimed in claim 5,
- wherein the first and second profiles each have profiled regions which extend parallel to the floor (3) and through which screws are guided for fixedly anchoring the stand foot (6) on the floor.

7. The horizontal conveyor as claimed in claim 1,
- wherein the frame (7) of the main stand (5) comprises
  - side frames on which the rollers or rolls (8) are mounted, and
  - a base which is disposed between the side frames, and
- wherein the base is supported on the stand foot (6) and fixedly connected thereto.

8. The horizontal conveyor as claimed in claim 1,
- wherein the protective wall (20A, 20B) is fixed to upright supports (22) which are disposed in succession along the conveying section (2), and
- wherein lower ends (23) of the upright supports (22) are fastened to the main stand (5).

9. The horizontal conveyor as claimed in claim 8,
- wherein the protective wall (20A, 20B) is fixed to a side of the respective support (22) that faces the conveying section (2).

10. The horizontal conveyor as claimed in claim 8,
- wherein the lower ends (23) of the supports (22) are screwed or welded to the stand foot (6) of the main stand (5).

11. The horizontal conveyor as claimed in claim 8, wherein the supports (22), including the lower ends (23), are disposed at a vertical spacing from the floor (3).

12. The horizontal conveyor as claimed in claim 8, wherein the lower ends (23) of the supports (22) are screwed to the stand foot (6) of the main stand (5) and also to the floor (3).

13. The horizontal conveyor as claimed in claim 1, wherein the protective wall (20A, 20B) comprises at least one horizontally extending plank.

14. The horizontal conveyor as claimed in claim 13, wherein neither the plank nor parts thereof extend at a height lower than the width (B) of the conveying section (2).

15. The horizontal conveyor as claimed in claim 1, wherein the protective wall (20A, 20B) comprises a suspended safety net.

16. The horizontal conveyor as claimed in claim 3, wherein the protective walls (20A, 20B) which are disposed on each of the two sides of the conveying section (2) are lateral wall regions of a tunnel, and wherein the tunnel arches over the conveying section (2) in the shape of an inverted U.

* * * * *